May 19, 1953 R. D. MacDONALD 2,639,022
POWER ACTUATED CONVEYER TYPE LOADER
Filed Feb. 5, 1949 5 Sheets-Sheet 1
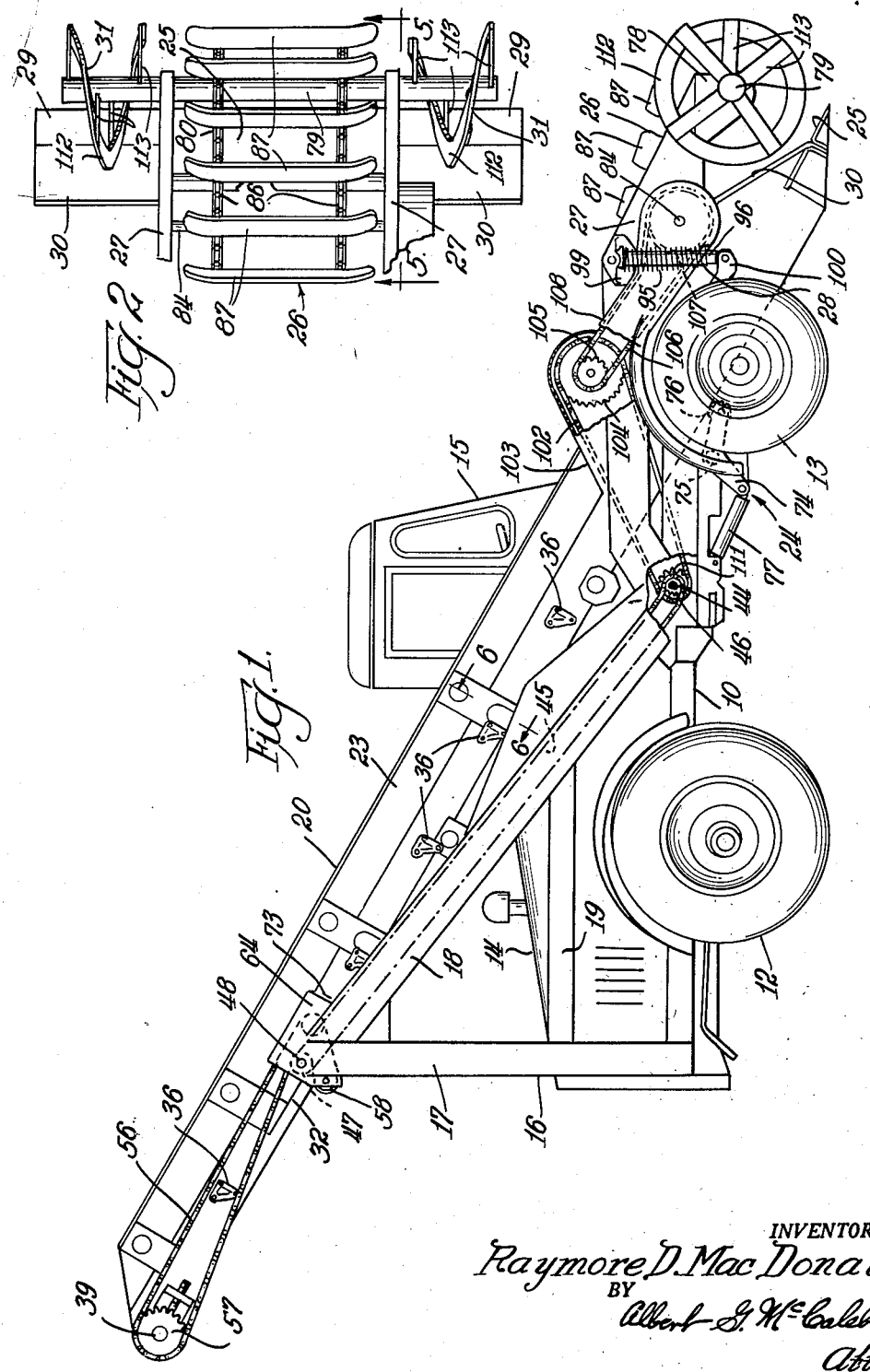
INVENTOR.
Raymore D. MacDonald
BY
Albert G. McCaleb
Atty.

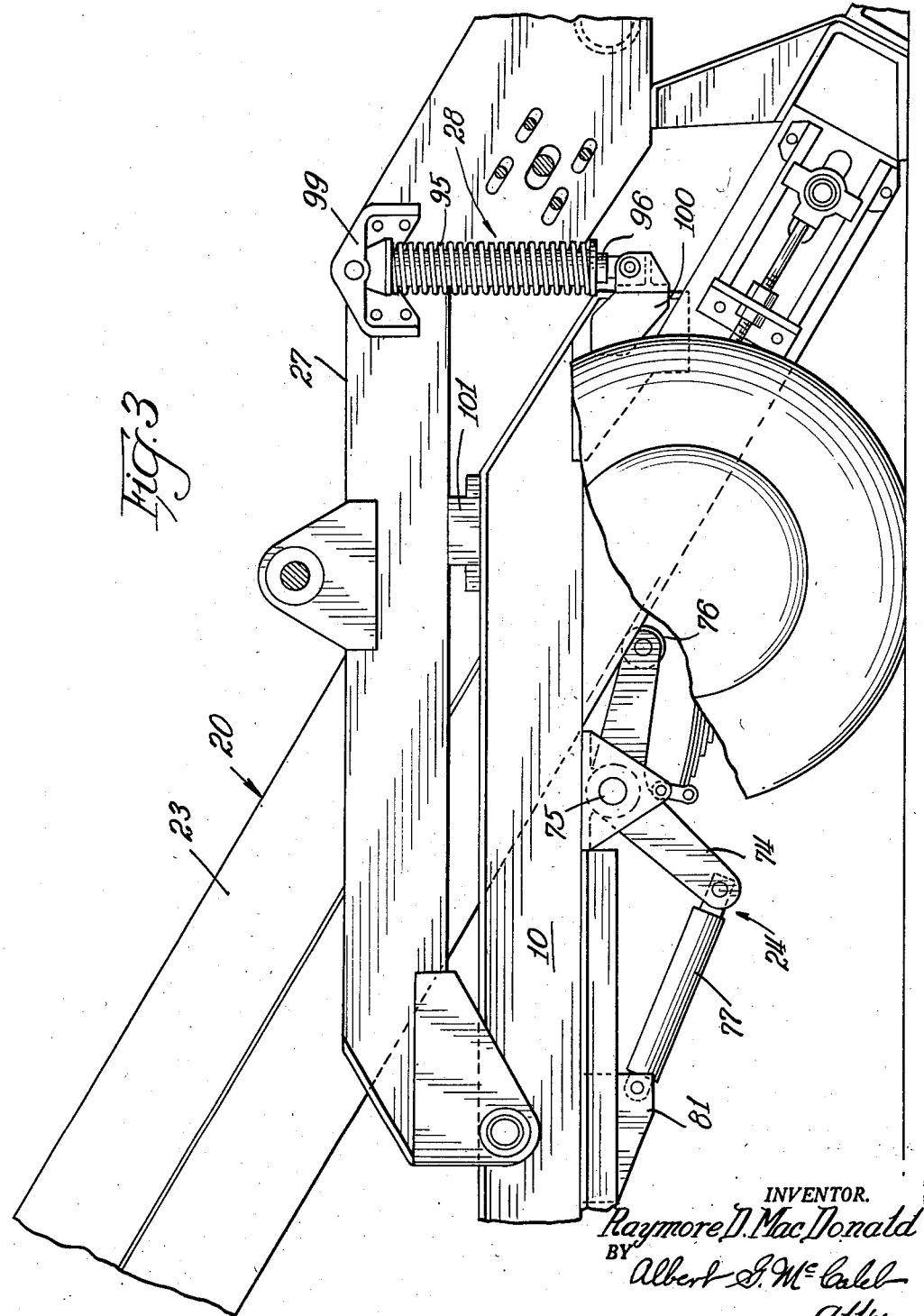

May 19, 1953  R. D. MacDONALD  2,639,022
POWER ACTUATED CONVEYER TYPE LOADER
Filed Feb. 5, 1949  5 Sheets-Sheet 3

INVENTOR.
Raymore D. MacDonald
BY Albert G. McCaleb
Atty.

May 19, 1953 — R. D. MacDONALD — 2,639,022
POWER ACTUATED CONVEYER TYPE LOADER
Filed Feb. 5, 1949 — 5 Sheets-Sheet 4

INVENTOR.
Raymore D. MacDonald
BY Albert G. McCaleb
Atty.

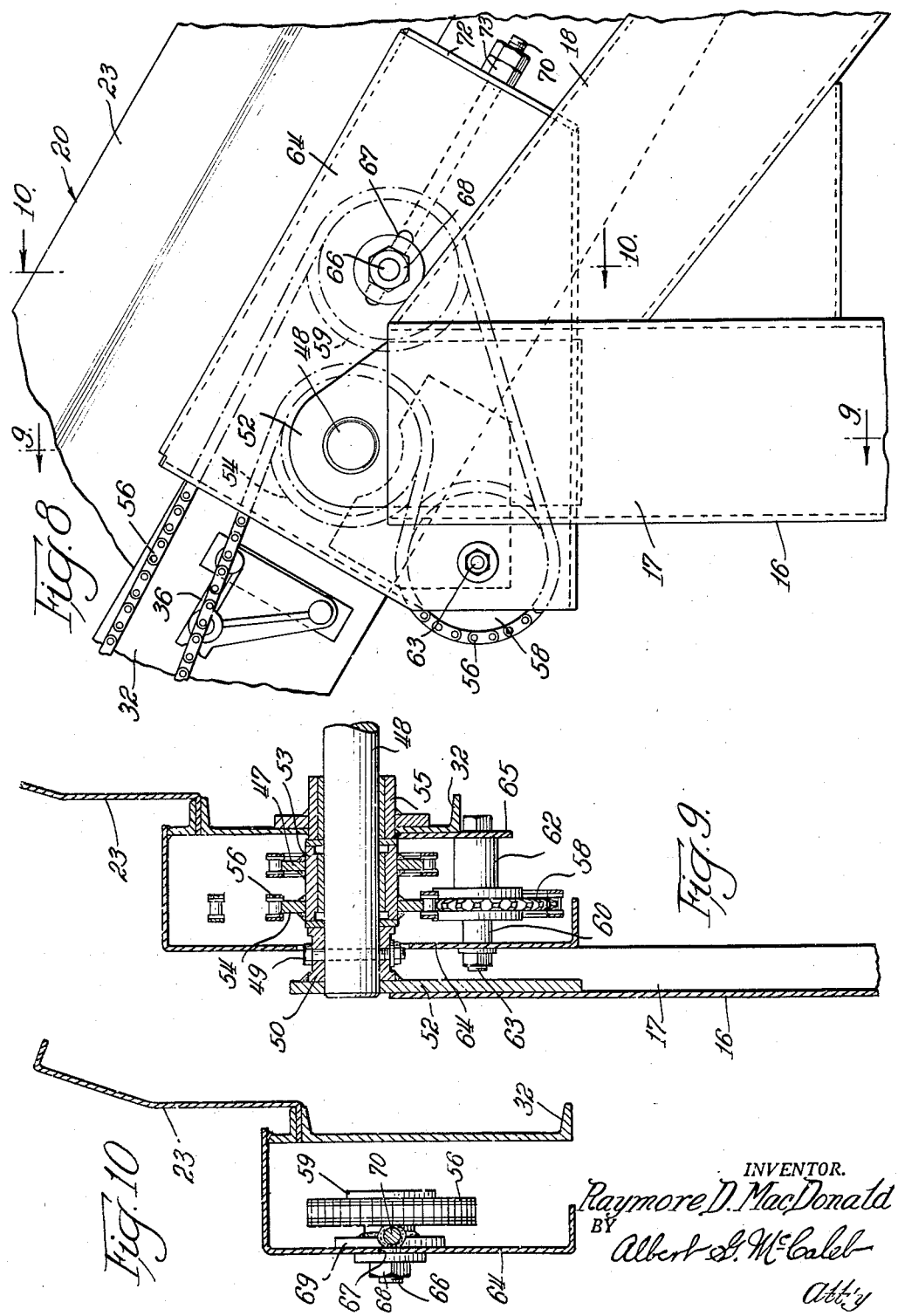

Patented May 19, 1953

2,639,022

UNITED STATES PATENT OFFICE 2,639,022

POWER ACTUATED CONVEYER TYPE LOADER

Raymore D. MacDonald, La Grange, Ill., assignor to Athey Products Corporation, Chicago, Ill., a corporation of Illinois Application February 5, 1949, Serial No. 74,743

3 Claims. (Cl. 198—9)

This invention relates to loaders, and more particularly to loaders of a type suited to self-propulsion and embodying power driven collecting and conveying equipment for gathering and removing material from the surface of a road or the like, elevating the material by a conveyor and feeding it into a conveyance, or other associated apparatus.

One of the more general objects of my invention is to provide a self-propelled loader embodying power driven elements at opposite sides of the front for moving material inwardly in directions lateral to the path of loader movement and from a relatively wide range to a power driven feeder conveyor having parts movable in accordance with the quantity and size of material moving therethrough, and thence to a power driven elevating conveyor of the endless belt type for loading purposes; all of the power driven parts being operated from the same prime mover that is used to motivate the loader.

Another, and somewhat more specific, object of the invention is to provide, in a loader of the type referred to and thus described, a resilient support for a feeder conveyor, which support provides an adjustment for determining the normal height of the feeder conveyor and is adjustable to change such height without materially altering the effective resilience thereof.

My invention further has within its purview the provision of a power driven scraper type of endless chain conveyor for moving material across an inclined plate to another conveyor, and which chain conveyor is mounted for vertical movement about an axis separated in position from the chain conveyor and normally supported in an adjusted position relative to said axis to determine the normal displacement thereof from the inclined plate; said chain conveyor being further susceptible to vertical movements about the last mentioned axis, so as to vary the distance between the conveyor and plate in amounts dependent upon the quantity and size of material moved across the plate thereby.

In my loader which embodies the conveyor structure of the preceding object, I have also provided resilient elements through which the chain conveyor is supported with respect to the other conveyor and at a distance from said axis, there also being provided a positive stop for preventing the chain conveyor from contacting the plate over which it moves material.

It is further within the comprehension of this invention to provide a loader embodying a power driven endless belt conveyor which slopes upwardly toward the rear of the loader from a position near ground level at the front of the loader, said conveyor being pivotally supported for movement relative to an axis near the rear end thereof, so that the front end may be adjusted to a selected height above ground, said loader also having a power driven feeder conveyor at the front end thereof for moving material onto the belt conveyor, which feeder conveyor is supported at its rear end for vertical swinging movement about a stationary axis which is independent of the belt conveyor, the forward end thereof being supported from the main chassis for movement relative to the belt conveyor.

In a loader embodying the structure set forth in the preceding object, it is within the purview of my invention to provide drive connections to the respective conveyors through which they are driven from a single power source and which each have an end coincident with the axis of movement of the conveyor to which they extend.

Another object of this invention is to provide, in loading apparatus, a belt conveyor embodying a flexible shield element secured to side panels of the conveyor and overlying the belt to prevent finely divided material from sifting off of the sides of the belt.

Other objects and advantages of the invention will be apparent from the following description and the accompanying drawings in which similar characters of reference indicate similar parts throughout the several views.

In the five sheets of drawings,

Fig. 1 is a general side elevational view of a loader embodying a preferred form of my invention;

Fig. 2 is a fragmentary top plan view of the front portion of the loader shown in Fig. 1;

Fig. 3 is an enlarged fragmentary side elevational view with portions broken away to illustrate parts of the structure of Fig. 1 in greater detail;

Figure 4:
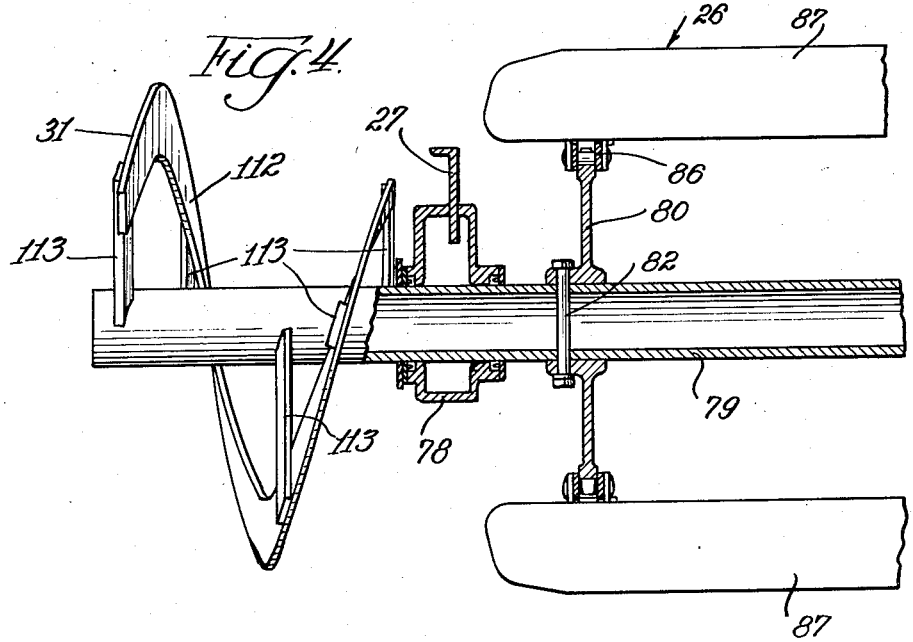
Fig. 4 is a fragmentary front elevational view, drawn to an enlarged scale, depicting a portion of the structure shown in Figs. 1 and 2, and wherein parts of the structure are shown in section.

Fig. 8 is a fragmentary side elevational view of a portion of the structure depicted in Fig. 1, drawn to a considerably larger scale so as to depict that portion of the structure in greater detail; and Figs. 9 and 10 are fragmentary end sectional views taken substantially on lines 9—9 and 10—10 of Fig. 8 respectively, and in the direction indicated by accompanying arrows.

Having reference to the general structure of my loader shown in the accompanying drawings for illustrative purposes, such loader is depicted in Fig. 1 as a self-propelled mobile unit adapted to road work and the like. This exemplary unit has a main chassis or frame 10 supported at the rear by driven wheels 12 and at the front by steerable wheels 13. A prime mover, such as an internal combustion engine, is mounted within a housing 14 at the rear of the main frame. Carried by the main frame at one side of the loader and near the longitudinal mid-portion thereof is an operator's cab 15 from which the loader may be driven and the various operating parts thereof controlled, and from which an operator may observe the operations of those operating parts.

An A-type frame 16 is secured to and extends upwardly from the rear portion of the main frame 10, and has side portions in opposed relationship on the opposite sides of the main frame, each of which side portions includes a rear upright 17, a diagonal brace 18 and a horizontal brace 19. The rear uprights 17 and the diagonal braces 18 are secured together at their upper ends and each has its lower end secured to the main frame. The opposite ends of the horizontal braces 19 are secured to the mid-portions of the rear uprights and the diagonal braces to strengthen the side frame structures. This A-type frame structure provides an elevated rear support, relative to which the rear end of an elevating conveyor 20 is supported for swinging movement in a vertical plane. In the present instance, the elevating conveyor 20 is of the endless belt type having a longitudinally extending conveyor belt 22 carried between opposed side panels 23. The front end of the elevating conveyor 20 is supported for vertical movement relative to the main frame 10 through an adjustable lifting mechanism 24. At its extreme forward end, the elevating conveyor is provided with a plate 25 sloping upwardly to a position overlying the lower end of the conveyor belt, and across which plate material is moved to the conveyor belt.

For the purpose of feeding material across the plate 25 and to the conveyor belt, I have provided an endless chain and scraper type of feeder conveyor 26. This conveyor, in order to compensate for operating conditions, including the amount of material being moved by the conveyor as well as to prevent damage thereto when rocks or large pieces of material are encountered, is preferably supported for vertical swinging movement by side arms 27; the side arms being supported relative to the main frame 10 at their rear ends and extending forwardly to positions ahead of the elevating conveyor and such that the feeder conveyor overlies the plate 25. In the disclosed loader, the forward ends of the side arms 27 are supported for movements, relative to the forward end of the elevating conveyor by adjustable supporting elements 28.

In order to broaden the path from which material is gathered by the disclosed loader, lateral extensions 29 are provided on opposite ends of the plate 25, which extensions project laterally beyond the sides of the elevating conveyor 20 and are adjoined by substantially coextensive side plates 30 having forwardly facing surfaces disposed in obtuse angular relationship to the upper surfaces of the plate extensions 29. On opposite sides of the feeder conveyor 26 and at positions adjacent the lateral extensions 29 of the plate 25 and in front of the side plates 30, opposed screw type conveyors 31 are mounted for moving material inwardly toward the feeder conveyor. In each instance, and as will be more fully described, the various cooperating conveyors of my preferred loader, disclosed herein, are driven from the same prime mover which is utilized to propel the loader.

Figure 6:
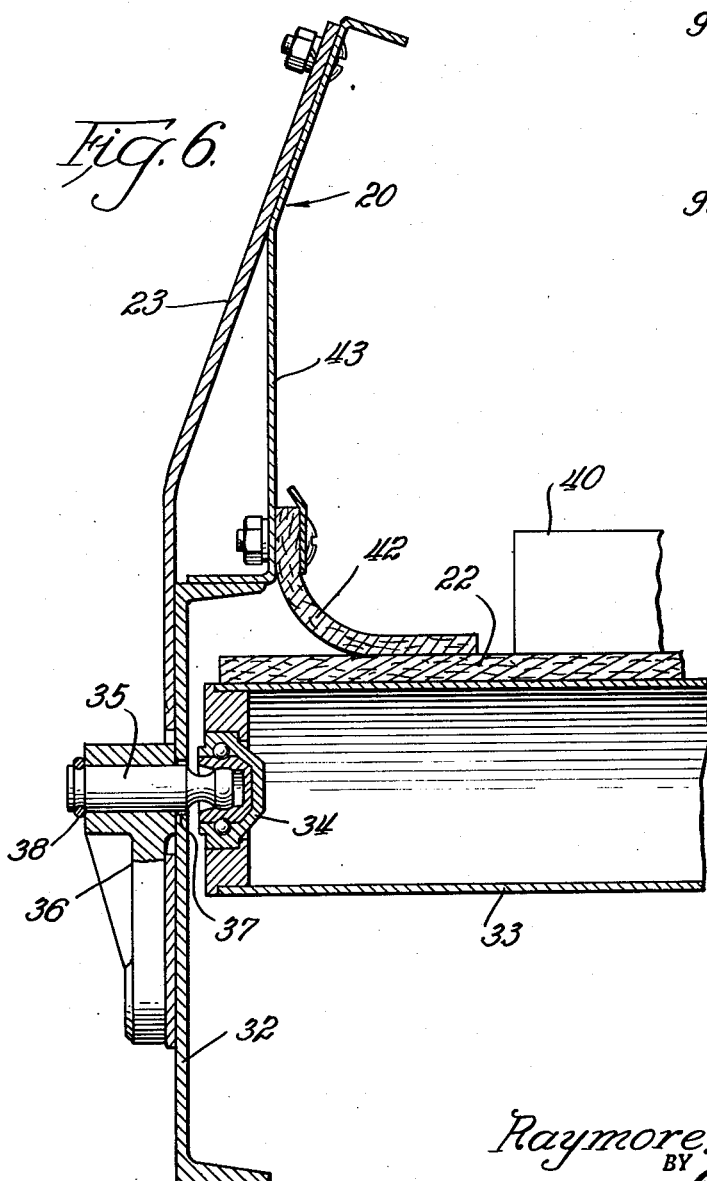
Fig. 6 is a fragmentary end sectional view, drawn to an enlarged scale, and taken substantially as indicated by a line 6—6 in Fig. 1 and accompanying arrows.

Referring in greater detail to portions of the structure which have thus far been generally discussed, and having particular reference to Figs. 1 and 6, the elevating conveyor 20 includes opposed and substantially parallel side channels 32 between which belt supporting rollers 33 are supported in spaced relationship longitudinally of the channels to carry the upper portion of the belt 22. As depicted in Fig. 6, the belt supporting rollers 33 of my preferred structure are rotatably supported at their opposite ends by bearings 34, which bearings are each supported by a stud shaft 35 carried by a bracket 36 secured to the outer surface of the side channel; each stud shaft projecting inwardly of the channel through an opening 37 therein and being held in position at its outer end by a C-type snap ring fastener 38. Thus, the rollers 33, except for one at the upper end of the elevating conveyor which is carried by and drivingly connected to a conveyor drive shaft 39, are free to rotate for supporting the upper load carrying portion of the belt, while the lower or return portion of the belt is suspended and out of engagement with the rollers 33. Cleats, such as 40, may, when desired for the handling of many types of materials, be secured to the upper surface of the belt in spaced relationship longitudinally of the belt.

In the preferred structure of my loader, and particularly when that loader is to be utilized for loading material which includes relatively fine particles, it is my preference to provide flexible webs 42 which extend along opposite sides of the belt and which engage a marginal portion of the belt in overlying relationship. As depicted in Fig. 6, each flexible web, which may be made of a flexible and wear resistant material, such as relatively heavy sheet rubber, has one side secured to an internal apron 43 on the side panel 23 at positions spaced longitudinally of the conveyor; the web extending downwardly and inwardly from the apron in overlying contact with a substantial portion of the belt margin outside of the ends of the cleats 40.

In my disclosed structure, a main conveyor drive shaft 44 (Fig. 1) extends laterally of the main frame 10, which drive shaft is driven through a suitable transmission (not shown) from the motor prime mover and controlled from the cab 15. An elevating conveyor drive chain 45 extends upwardly along the diagonal brace 18 on the side of the conveyor opposite the cab 15 from a sprocket 46 drivingly secured to the end of the main conveyor drive shaft 44.

This drive chain 45 is preferably enclosed within a housing and at its upper end engages and is carried by a sprocket 47 mounted on a shaft 48, which shaft is disposed at the apex of the A-type frame 16. As depicted in Figs. 8 and 9, the ends of the shaft 48 are secured by fastening means such as bolts 49 to support bearings 50 at the upper ends of plates 52, which plates are secured to the upper ends of the uprights 17 of the A-type frame. As also depicted in Fig. 9, the sprocket 47 which carries the upper end of the conveyor drive chain 45 is journalled relative to the shaft 48 by a bearing 53, which bearing also carries a second sprocket 54 axially spaced from the sprocket 47. Both of the sprockets 47 and 54 are secured to the bearing 53, as by welding, so that the two sprockets are drivingly connected through the bearing structure. In addition to supporting the drivingly connected sprockets 47 and 54, the shaft 48 also provides an axis for the vertical swinging movement of the elevating conveyor 20 so that the axis of conveyor movement coincides with the common axis of the sprockets 47 and 54. The support of the upper end of the conveyor 20 from the A-type frame and the shaft 48 is effected through bearings 55 secured to the inner surfaces of the conveyor supporting side channels 32. Thus, since the main conveyor drive shaft 44 is supported from the main frame 10, and the shaft 48 upon which the sprocket 47 is mounted, is coaxial with the axis of swinging movement of the conveyor, such conveyor movement does not affect the tension of the elevating conveyor drive chain 45.

A second elevating conveyor drive chain 56 is driven from the sprocket 54 through the sprocket 47 and conveyor drive chain 45, and transmits motion to the conveyor belt 22 through a sprocket 57 which is drivingly connected to the conveyor drive shaft 39 at the upper extreme end of the elevating conveyor 20. In order to provide the proper direction of movement for the second conveyor drive chain 56, and to provide for the adjustment of the tensioning of that second drive chain, as well as to provide an arrangement of sprockets such that movements of the elevating conveyor do not affect the tension of the second drive chain, I utilize the three-sprocket combination depicted in Figs. 8 and 9. In this arrangement, idler sprockets 58 and 59 are mounted in substantially coplanar relationship with respect to the driven sprocket 54, while the axes of the idler sprockets are disposed at different elevations and on opposite sides of the axis of the driven sprocket 54. Rather than extending directly from the driven sprocket 54 to the sprocket 57 at the end of the elevating conveyor, the outer surface of the chain 56 encompasses a portion of the driven sprocket 54, while the inner surface of that chain encompasses portions of the idler sprockets 58 and 59, whereby the chain 56 is moved in a direction reversed to that of the conveyor drive chain 45.

As depicted in Fig. 9, the idler sprocket 58 is journalled between spacing collars 60 and 62 on a shaft 63, which shaft is secured to and supported between cover plates 64 and 65. The mounting of the idler sprocket 59 is illustrated in Figs. 8 and 10. It is carried by a stud shaft 66 which extends through an elongated slot 67 in the cover plate 64 and secured in position by fastening means such as a nut 68; the sprocket being spaced from the interior of the cover plate by a flanged hub 69. In order to facilitate the positioning of the sprocket 59, so as properly to tension the belt 56, a threaded stud 70 is secured to the hub 69 and projects therefrom in a direction lateral to the axis of the shaft 66 and parallel to the elongation of the slot 67. This stud extends through an end plate 72 which is secured to the cover plate 64 and has fastening means such as a nut 73 thereon for effecting adjustment of the position of the shaft 66 in the slot 67 when the nut 68 is loosened. The axis of the threaded stud 70 and the elongation of the slot 67 being disposed to correspond to the elongated side portions of the chain 56, slack is taken out of that chain by tightening of the nut 73.

As depicted in Fig. 1, the lifting mechanism 24 which supports the lower end of the elevating conveyor 20, includes a bell crank 74 secured to one end of a shaft 75 which is journalled on the main frame 10 and extends laterally thereof. The bell crank 74 has arms projecting in obtuse angular relationship to one another, one of which carries a roller 76 which engages the lower surface of the elevating conveyor 20, near the front thereof, and the other of which is movably connected to a hydraulic jack 77; the other end of the jack being movably anchored to the main frame 10 through an anchor plate 81 (Fig. 3). Thus, when the hydraulic jack 77 is varied in length, the bell crank 74 is rotated about the axis of the shaft 75 to raise or lower the position of the lower end of the elevating conveyor.

The side arms 27 which carry the feeder conveyor 26 are supported at their rear ends for vertical swinging movement about the axis of the main conveyor drive shaft 44. As depicted in Figs. 1, 2, 4 and 5, bearings 78 at the front ends of side arms 27 rotatably support a cross shaft 79 which is preferably tubular in section and which not only extends between the side arms, but also projects a substantial distance on the outsides of the arms. Between the side arms 27, sprockets 80 are drivingly secured to the shaft 79 by fastening means such as bolts 82; the sprockets 80 being separated a distance which is preferably somewhat less than the width of the elevating conveyor and spaced inwardly of the side arms. Additional sprockets 83 are aligned with the sprockets 80 and secured to a shaft 84 which is journalled in bearing blocks 85 mounted on the side arms 27 at a position rearwardly of the arms 27 from the sprockets 80 and above the lower end of the elevating conveyor. The aligned sprockets 80 and 83 carry endless conveyor chains 86, which conveyor chains have scraper blades 87 secured to their outer surfaces so as to project outwardly from the chain surfaces and extend across the chains in a direction generally parallel to the axis of the shafts 79 and 84. Preferably, the ends of the blades are curved, so that in their normal direction of movement, which is rearward on the lower sides of the sprockets, they tend to gather material inwardly while moving it to the rear across the plate 25 and onto the lower end of the elevating conveyor belt 22.

When the quantity of material is small and when the sizes of the pieces are generally small, it is preferable to operate the loader with the feeder conveyor in relatively close proximity to the plate 25. When the sizes of the pieces of material are larger, or when the quantity of material is larger, improved operation is effected by having the feeder conveyor elevated to some extent above the level of the plate 25. In any instance, there is a possibility of occasionally encountering a rock or a large piece of material in normal loading operations. Furthermore, resilience in the support of the feeder conveyor is desirable in a propelled loader of the type disclosed, in order to limit shock forces on the loader structure which result from movements over rough terrain or the encountering of rocks or large pieces of material, as aforementioned. The desirable variations in the normal elevation of the feeder conveyor and the preferred resilience in the support thereof are provided for in the disclosed loader by the adjustable supporting elements 28.

Figure 7:
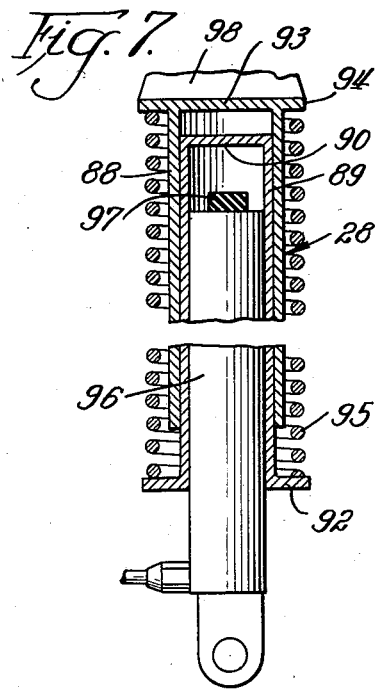
Fig. 7 is a fragmentary side sectional view, drawn to an enlarged scale, which depicts structural details of a part of the loader illustrated in Fig. 1.

As depicted in Figs. 1 and 7, the adjustable supporting elements 28 include telescopically engaging cylinders 88 and 89 fitted together for axial sliding movement relative to one another. The inner one of the cylinders 89 has a closed inner end 90, while the other end of that cylinder is open and is provided with a radial flange 92 projecting outwardly. In like manner, the end of the outer cylinder 88 into which the cylinder 89 extends is normally open, while a closure plate 93 seals the other end of the cylinder 88 and provides a peripheral flange 94 projecting radially from the cylinder at that end. A compression spring 95 has its turns encompassing the telescopically engaged cylinders and is disposed between the flanges 92 and 94 thereon. In each instance (there being like loading elements 28 on each side of the loader for supporting the feeder conveyor) the springs 95 have strength such that the telescopically engaged cylinders 88 and 89 are normally biased to a partially extended position against the load of the feeder conveyor structure supported thereby. The springs 95 thus provide resilience in the support of the feeder conveyor.

In addition to the resilient support for the feeder conveyor which is provided by the combination of the telescopically engaged cylinders 88 and 89 and the intervening compression spring, the inner cylinder 89 has a hydraulic piston 96 fitted into the open end thereof to form an adjustable hydraulic jack which serves to extend or retract the length of each supporting element without interfering with the resilience or action of the springs 95. Preferably, a block of resilient material 97 is secured to the inner end of the piston to determine the retracted position thereof and absorb shock when the piston moves into its cylinder. Downward movement of the side arms 27, however, is limited by stop blocks 101 secured to the forward ends of the main frame 10, as shown in Fig. 3, in position for engagement with the bottoms of the arms. The height of the blocks 101 is determined so as to prevent contact of the scraper blades 87 with the plate 25. The plate 93 at the end of the cylinder 88 has an angularly disposed portion 98 thereon which is secured to a bracket 99 on the side arm 27. Also, a bracket 100 which is secured to and projects forwardly from the main frame 10 is connected to and supports the outer end of the hydraulic piston 96. With supporting elements of this type, it may be readily understood that the feeder conveyor is supported for vertical movements relative to the elevating conveyor, and that resilience is provided in the support regardless of the adjusted position of the feeder conveyor.

The feeder conveyor 26, like the elevating conveyor 20, is driven from a sprocket 111 secured to the end of the main conveyor drive shaft 44 through a drive chain 102 enclosed within a housing 103 extending upwardly and forwardly to a sprocket 104 which is journalled for rotation on the top of one of the side arms 27. Another sprocket 105 is drivingly connected to the sprocket 104 and carries one end of a second feeder conveyor drive chain 106, which latter chain, at its other end, is carried by a sprocket 107 secured to the end of the shaft 84; the latter of which shafts has the feeder conveyor sprockets 83 secured thereto. By preference, the chain 106 is enclosed within a housing 108. Since the arms 27 are mounted for free vertical swinging movement on an axis coinciding with that of the main conveyor drive shaft, such swinging movements of the arms do not affect the tension of the feeder conveyor drive chain 102. Both ends of the second feeder conveyor drive chain move with the side arm, so that the tension thereof is unaffected by side arm movements.

Figure 5:
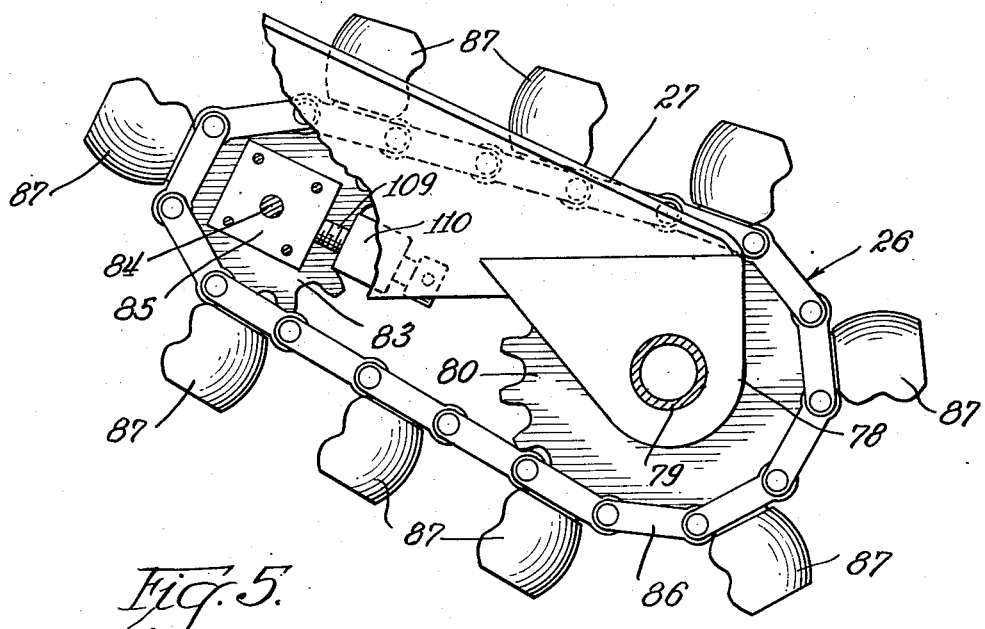
Fig. 5 is a side sectional view taken substantially on a line 5—5 in Fig. 2 and in the direction indicated by the arrows.

Preferably, the bearing block 85, for each side arm, as depicted in Fig. 5, is mounted for movement longitudinally of the side arm, in order to adjust the tension of the feeder conveyor chains 86. In the disclosed structure, the position of each such bearing block 85 is determined by a screw 109 threaded into a collar 110 secured to the side arm and having an end abutting the bearing block on the side opposed to the normal tension of the adjacent feeder conveyor chain.

In the disclosed structure, and as illustrated in Figs. 1, 2 and 4, each screw type conveyor 31 comprises an edgewise wound metal strip 112 having an outer diameter corresponding closely to that of the arc defined by the outer edges of the scraper blades as they pass over the periphery of the sprocket 80. In addition to concentrically encompassing the projecting end portion of the shaft 79, the turns of the strip extend axially of each projecting end of the shaft 79 to form helices. Each helix is supported relative to the projecting end of the shaft by a series of radial spokes 113 secured to the shaft and to the strip. Also, the axial displacement of successive portions of each helical strip is so related to the normal direction of movement of the feeder conveyor 26 and shaft 79 that material is moved inwardly toward the feeder conveyor thereby as the operation of the loader progresses, these screw type conveyors being backed by the lateral extensions 29 of the plate 25 and the laterally extending side plates 30 to increase their effectiveness. The screw type conveyors, being driven through and from the feeder conveyor during the operation of the loader, deliver material to the feeder conveyor and extend the effective width of the path covered by the loader.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a loader, the combination comprising a main chassis, an elevating conveyor, a feeder conveyor mounted at the lower end of the elevating conveyor for moving material to the elevating conveyor, each of said conveyors being movable in a vertical plane, means for adjusting the height of the lower end of the elevating conveyor, and means acting between the feeder conveyor and the front end of the main chassis below the feeder conveyor to adjust the latter, said means comprising two members slidably engaged for linear movement with respect to one another, a spring normally biasing said members to a partially extended position relative to one another, one of said members being connected to said one end of the feeder conveyor, and a third member connected with the front end of the main chassis below the feeder conveyor and cooperating with the other of said members to form an extensible hydraulic jack.

2. In a loader, the combination comprising a main chassis, an elevating conveyor mounted for swinging movement about one end on the main chassis and sloping downward from said one end, a feeder conveyor positioned over the lower end of the elevating conveyor, a carrier for the feeder conveyor extending beyond one end of the feeder conveyor, means providing a swinging mounting of a region of the carrier beyond the said one end of the feeder conveyor on the main chassis below the elevating conveyor, and means connecting the carrier adjacent the said one end of the feeding conveyor and the main chassis below the last mentioned region so as to provide adjustable and floating support of the feeding conveyor, the last mentioned means comprising telescoping cylinders having flanges, a spring acting between the flanges to make the feeder conveyor and its carrier float on the main chassis, and a piston slidable in one of the cylinders so as to cooperate therewith to form an hydraulic device to adjust the feeder conveyor and its carrier on the main chassis.

3. The combination specified in claim 2 and further comprising an hydraulic device for adjusting the elevating conveyor on the main chassis.

RAYMORE D. MacDONALD.

References Cited in the file of this patent

UNITED STATES PATENTS

| Number | Name | Date |
|---|---|---|
| 1,422,002 | Shaw | July 4, 1922 |
| 1,463,654 | McNulty | July 31, 1923 |
| 1,505,476 | London | Aug. 19, 1924 |
| 1,706,313 | Newdick | Mar. 19, 1929 |
| 1,764,084 | Nelson et al. | June 17, 1930 |
| 2,030,063 | Halleck | Feb. 11, 1936 |
| 2,208,128 | Holbrook et al. | July 16, 1940 |
| 2,315,091 | Fees | Mar. 30, 1943 |
| 2,317,644 | Russell | Apr. 27, 1943 |
| 2,323,368 | Biedess | July 6, 1943 |
| 2,364,282 | Fees | Dec. 5, 1944 |
| 2,366,536 | Levin | Jan. 2, 1945 |
| 2,368,353 | Fulper | Jan. 30, 1945 |
| 2,425,695 | Fees | Aug. 12, 1947 |
| 2,430,945 | O'Brien | Nov. 18, 1947 |

FOREIGN PATENTS

| Number | Country | Date |
|---|---|---|
| 275,073 | Great Britain | Aug. 4, 1927 |